United States Patent
Cook

[11] Patent Number: 5,199,209
[45] Date of Patent: Apr. 6, 1993

[54] FISH HOOK ATTACHMENT FOR FISH HOOK CONSTRUCTION

[75] Inventor: Russell Cook, Wellesley, Mass.

[73] Assignee: Wellesley Research Associates, Inc., Wellesley, Mass.

[21] Appl. No.: 674,113

[22] Filed: Mar. 25, 1991

Related U.S. Application Data

[63] Continuation-in-part of Ser. No. 525,644, May 21, 1990, Pat. No. 5,056,257, which is a continuation-in-part of Ser. No. 441,638, Nov. 27, 1989, Pat. No. 4,987,696.

[51] Int. Cl.⁵ .............................................. A01K 83/00
[52] U.S. Cl. ................................... 43/43.16; 43/42.38
[58] Field of Search ................ 43/43.16, 44.82, 42.09, 43/44.91, 42.38, 44.8

[56] References Cited

U.S. PATENT DOCUMENTS

| | | | |
|---|---|---|---|
| 849,036 | 4/1907 | Zimmerman | 43/448 |
| 1,573,288 | 2/1926 | Wilson | 43/42.38 |
| 2,632,278 | 3/1953 | Raymond | 43/44.82 |
| 2,713,742 | 7/1955 | Holdaway | 43/42.38 |
| 2,990,641 | 7/1961 | Weidman | 43/43.16 |
| 3,758,976 | 9/1973 | Szwolkon | 43/43.16 |
| 3,964,202 | 6/1976 | Ruppa | 43/42.38 |
| 4,796,378 | 1/1989 | Krueger | 43/42.38 |
| 4,987,696 | 1/1991 | Cook | 43/43.16 |

FOREIGN PATENT DOCUMENTS

| | | | |
|---|---|---|---|
| 819375 | 8/1969 | Canada | 43/42.09 |
| 15047 | 3/1906 | Norway | 43/42.38 |
| 54891 | 2/1935 | Norway | 43/42.38 |

Primary Examiner—Kurt Rowan
Attorney, Agent, or Firm—Paul J. Cook

[57] ABSTRACT

A fish hook attachment is provided which includes at least one (a) hydrofoil or (b) stabilizer and hydrofoil of unitary construction secured to a hollow shank having a slot which extends along the length of the hollow shank. Each unitary construction is secured to a hook shank so that the hydrofoil portion is positioned at an angle between 5° to 85° degrees from the hook shank. The hydrofoil portion of the the unitary construction is positioned substantially perpendicular to the plane defined by the hook shank and hook elbow.

14 Claims, 2 Drawing Sheets

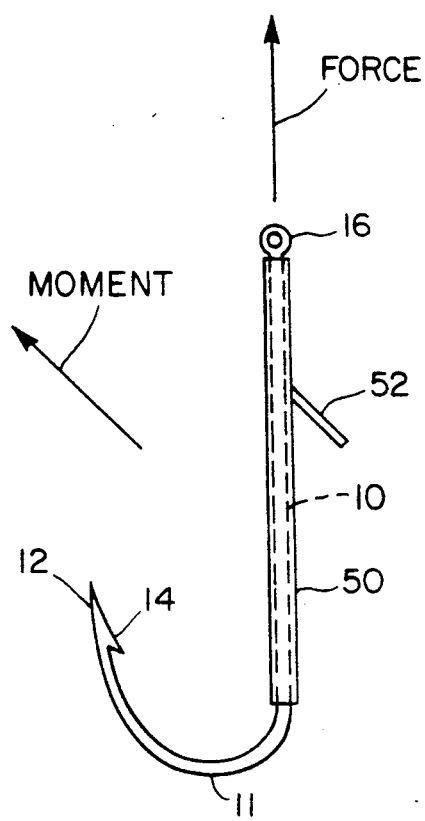
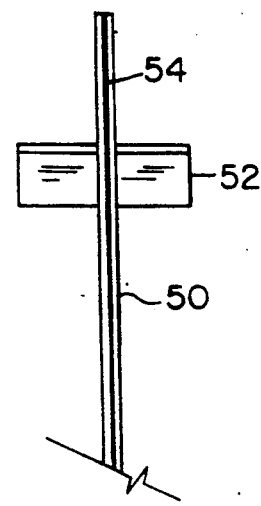
Fig. 7    Fig. 8
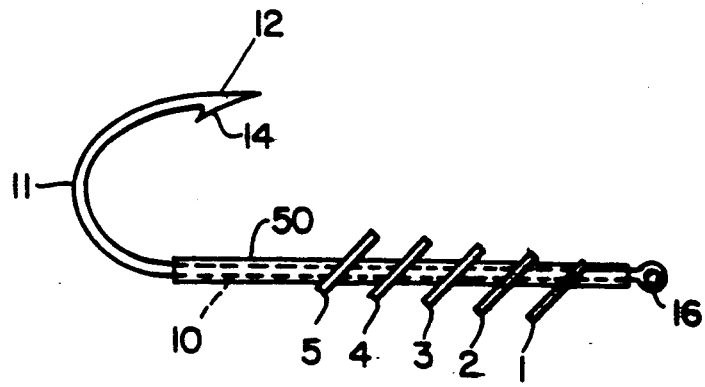
Fig. 9

FISH HOOK ATTACHMENT FOR FISH HOOK CONSTRUCTION

REFERENCE TO RELATED APPLICATION

This application is a continuation-in-part of application Ser. No. 525,644, now U.S. Pat. No. 5,056,257 filed May 21, 1990 which, in turn is a continuation-in-part of application Ser. No. 441,638, filed Nov. 27, 1989, now U.S. Pat. No. 4,987,696.

BACKGROUND OF THE INVENTION

This invention relates to a fish hook attachment to a fish hook to produce a fish hook construction adapted to increase the probability of implanting the hook into the tissue of a fish's mouth and decreases the probability of swallowing the hook by a fish during use by an angler.

Prior to this invention, it has been proposed in U.S. Pat. No. 699,397 to provide a fish hook with a vane or a hydrofoil which extends in a direction from the hook shank directly opposite to the direction of extension of the hook. By utilizing such a hydrofoil or vane, when the line attached to the hook is pulled, the hook will move upwardly toward the direction of pull. This upward move is caused by the drag imposed by the hydrofoil or vane which functions as a fulcrum to provide the upward hook movement. If the hook is positioned so that the hook extends away from the fish, the sudden pulling and upward movement of the hook will cause the hook to move away from the fish thereby rendering the hook useless. Accordingly, it would be be desirable to provide a fish hook which improves the probability of implanting the barbed point portion of the hook into the jaw or tissue of the mouth of the fish during use by an angler.

SUMMARY OF THE INVENTION

This invention provides a fish hook attachment which, with a conventional fish hook forms a fish hook construction which utilizes at least one unitary construction comprising a hydrofoil or a stabilizer hydrofoil rigidly secured to a hollow sleeve. The attachment is secured to a conventional hook positioned in a manner which promotes implanting the barbed point portion of the hook into the side of the mouth of a fish during use by an angler. The hydrofoil or hydrofoil portion of the unitary construction is positioned at an angle between 5°-85° from the hook shank in a direction toward the hook elbow as well as being positioned perpendicular to the plane defined by the shank and hook elbow. The fish hook attachment is conveniently snap fit onto a conventional fish hook. The probability of the hook being implanted into the mouth parts of the fish is substantially increased when the line attached to the hook is pulled by the angler.

BRIEF DESCRIPTION OF THE DRAWINGS

FIG. 7 is a side view of an alternative hook attachment of this invention secured on a hook.

FIG. 8 is a front view of the attachment of FIG. 7.

FIG. 9 is a side view of an alternative hook attachment of this invention positioned on a hook.

DESCRIPTION OF SPECIFIC EMBODIMENTS

In accordance with this invention, a fish hook attachment comprising a unitary construction having either (a) hydrofoil or (b) a hydrofoil and a stabilizer attached to a fish hook shank. The unitary construction is formed integrally with a hollow sleeve. The hydrofoil is positioned at an angle between 5°-85° from the hook shank in a direction substantially perpendicular to the plane defined by the shank and the elbow of a hook. One or more unitary constructions each positioned in the same manner can be attached to the hollow sleeve. The hollow sleeve includes a slot extending its entire length and the hook shank is secured to the sleeve by being snap fit through the slot. The hollow sleeve is formed of a flexible material such as a polymeric resin so that it can be snap fit around the hook shank.

In use, when a line attached to the hook is pulled by the angler, the hydrofoil positioned on the hook shank provides hydrodynamic lift so that the hook barb is lifted in a direction the same as the direction of the hydrofoil. Since the hydrofoil is positioned at an angle between about 5° and 85°, preferably from 30° to 60° from the axis defined above, the hook is lifted in a direction toward the mouth of the fish In any event, the hook is not moved in a direction away from the fish mouth tissue. Thus, the fish hook of this invention provides greatly improved probability of being implanted into the mouth tissue of the fish.

Figure 1:
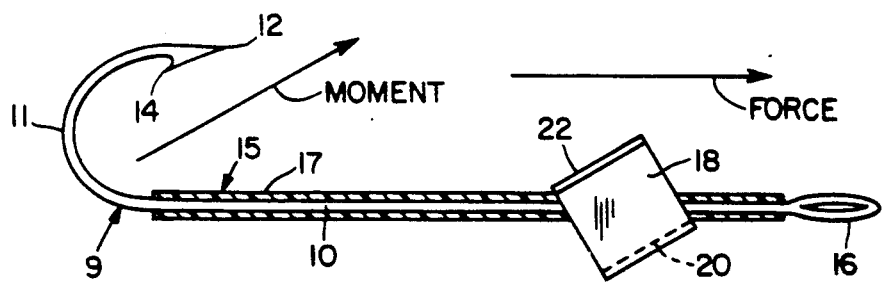
FIG. 1 is a side view in partial cross section of a hook construction including the fish hook attachment of this invention having two hydrofoils positioned in opposite direction to each other.
Figure 2:
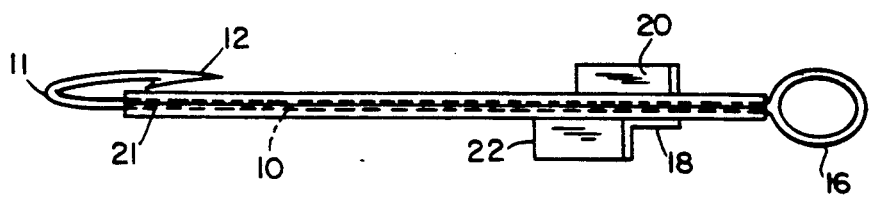
FIG. 2 is a top view of the hook attachment of FIG. 1.

Referring to FIGS. 1 and 2, the fish hook attachment of this invention is secured to a hook 9 comprises a fish hook shank 10, an elbow 11, a hook 12 and a hook barb 14 of unitary construction. A loop 16 is attached to hook shank 10 in order to provide a means for attaching a line to the hook construction. The attachment 15 of this invention includes a hollow shank 17 and a unitary construction comprising a stabilizer 18 and two hydrofoils 20 and 22 extending in opposite directions to each other is attached to the hook shank 10 by being snap fit by means of a slot 21 (FIG. 2) which permits the hollow shank 17 to be positioned around hook shank 10. The hydrofoils 20 and 22 extend in a direction between 30 to 60 degrees from the hook shank (See FIG. 3) as well as being positioned perpendicular to the plane defined by the shank 10 and hook elbow 11 from an axis defined by hook 12 and the cross section of shank 10. As shown in FIG. 1, the barb 14 extends from the hook 12 toward shank 10.

Figure 3:
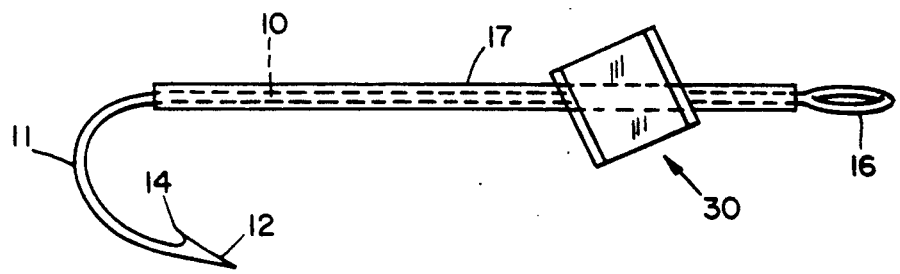
FIG. 3 is a side view of the hook attachment of this invention having multiple unitary construction comprising a stabilizer and hydrofoils.
Figure 4:
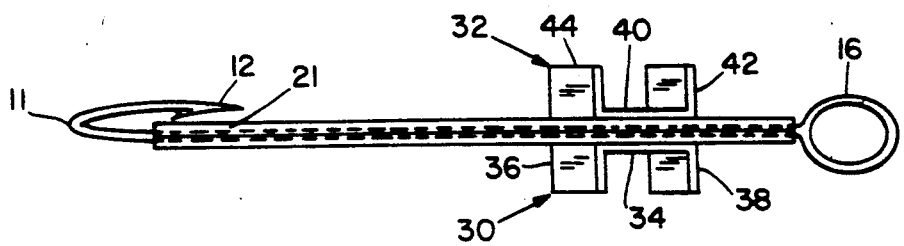
FIG. 4 is a top view of the hook attachment of FIG. 3.

An alternative embodiment is shown in FIGS. 3 and 4 wherein reference numerals as in FIGS. 1 and 2 refer to the same fish hook construction elements. As shown in FIGS. 3 and 4, a plurality of hook attachments comprising a hollow shank 17 and unitary constructions 30 and 32 are shown. The unitary construction 30 comprises a stabilizer 34 and two hydrofoils 36 and 38. The unitary construction 32 comprises a stabilizer 40 and two hydrofoils 42 and 44. The unitary constructions 30 and 32 are positioned so that the hydrofoils 36, 38, 42 and 44 are at an angle between 5° and 85° from the plane defined by the shank 10 and elbow 11.

Figure 5:
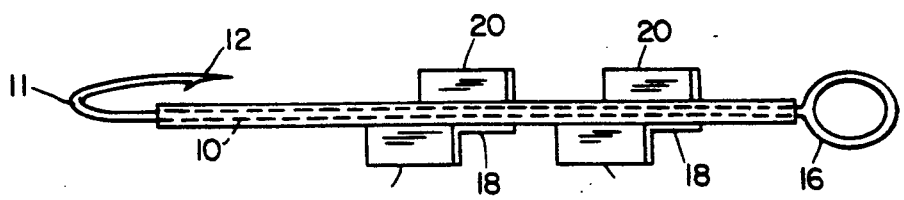
FIG. 5 is a top view of the hook attachment of FIG. 1 with multiple unitary construction.
Figure 6:
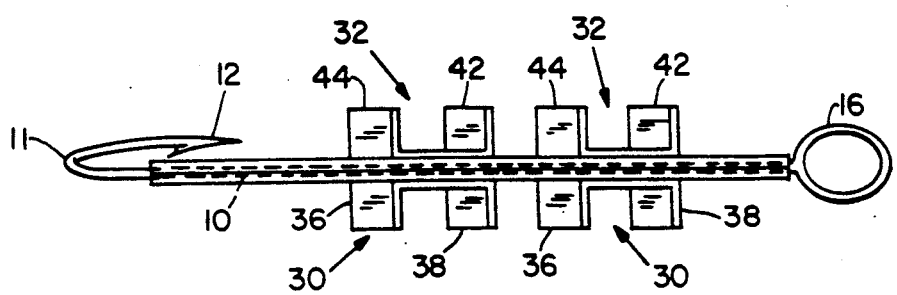
FIG. 6 is a top view of the hook of FIG. 4 with additional unitary construction.

As shown in FIGS. 5 and 6 additional unitary constructions having hydrofoils and a stabilizer can be added to the hook attachments of FIGS. 1-4.

Referring to FIG. 7, the fish hook attachment of this invention comprises a hollow shank 50, and hydrofoil 52 attached to a hook shank 10 having an elbow 11, a hook 12 and a hook barb 14. A loop 16 is attached to shank 10 in order to provide a means for attaching a line to the hook construction. The hydrofoil 52 is formed integrally with shank 50. The hydrofoil 52 extends in a direction between 5° to 85° from the hook shank 10 in a direction between 5° to 85° from the hook shank 10 in a direction toward the hook elbow 11 as well as being positioned perpendicular to the plane defined by the shank 10 and hook elbow 11 from an axis defined by hook 12 and the cross section of shank 10. As shown in FIG. 2, the shank 50 includes a slot 54 which permits the shank 50 to be snap fit on hook shank 10. As shown in FIG. 1, the barb 14 extends from the hook 12 toward shank 10.

An alternative embodiment is shown in FIG. 9 wherein reference numerals as in FIGS. 7 and 8 refer to the same fish hook attachment elements. As shown in FIG. 9, a plurality of hydrofoils 1, 2, 3, 4 and 5 each positioned on the shank 50 in the manner described above. The hydrofoils are offset from each other so that the hydrofoil 5 is closest to hook 12 and hydrofoil 1 is further away from the hook 12. This arrangement of a plurality of hydrofoils (two or more) provides an anticavitation effect.

The surface design of the hydrofoil is not critical to the present invention so long as it provides hydrodynamic drag when a line attached to the loop 16 is pulled. Thus, the hydrofoil can have a circular plan view, elliptical cross-section, triangular cross-section or the like and can be provided with small holes if desired. Also, the present invention contemplates one or a plurality of hooks attached to one or a plurality of hook shanks, each of which are attached to a common unitary construction, if desired.

I claim:

1. An attachment adapted to fit about a shank of a fish hook, said hook having a hook shank, a hook barb attached to said shank by a hook elbow, said hook barb defining one end of said construction, said attachment comprising a hollow sleeve having a slot extending the entire length of said sleeve, said sleeve having a size to permit said sleeve to fit tightly about said hook shank, a hydrofoil having a first surface rigidly secured to said sleeve, said hydrofoil extending in a direction between 5° and 85° from the sleeve shank in a direction away from said hook elbow, said first surface being positioned perpendicular to a plane defined by the shank and hook elbow, said hydrofoil having a free unsecured end and means for attaching a line to said hook.

2. The construction of claim 1 wherein a plurality of hydrofoils are positioned on said sleeve in the direction of claim 1.

3. The construction of claim 1 wherein said hydrofoil is positioned between 30° and 60° from the sleeve shank.

4. The construction of claim 2 wherein said hydrofoils are positioned between 30° and 60° from the sleeve shank.

5. A attachment adapted to fit about a shank of a fish hook, said fish hook having a hook shank, a hook barb attached to said shank and defining one end of said construction, said attachment comprising a hollow sleeve having a slot extending the entire length of said sleeve, said sleeve having a size to permit said sleeve to fit tightly about said hook shank, a unitary construction comprising a stabilizer secured to said sleeve positioned between 5° to 85° degrees from the sleeve shank and two hydrofoils secured to said stabilizer, the planes of said hydrofoils extending in a direction substantially perpendicular to said stabilizer and means for attaching a line to said hook.

6. The construction of claim 5 wherein said hydrofoils extend in directions opposite to each other from said stabilizer.

7. The construction of claim 5 wherein said hydrofoils extend in the same direction from said stabilizer.

8. The construction of claim 6 wherein a plurality of unitary constructions are positioned on said shank in the direction as defined in claim 3.

9. The construction of claim 6 wherein a plurality of unitary constructions are positioned on said shank in the direction as defined in claim 3.

10. The construction of claim 5 wherein said hydrofoils are positioned between 30° and 60° from the sleeve shank.

11. The construction of claim 6 wherein said hydrofoils are positioned between 30° and 60° from the sleeve shank.

12. The construction of claim 7 wherein said hydrofoils are positioned between 30° and 60° from the sleeve shank.

13. The construction of claim 8 wherein said hydrofoils are positioned between 30° and 60° from the sleeve shank.

14. The construction of claim 9 wherein said hydrofoils are positioned between 30° and 60° from the sleeve shank.

* * * * *